UNITED STATES PATENT OFFICE.

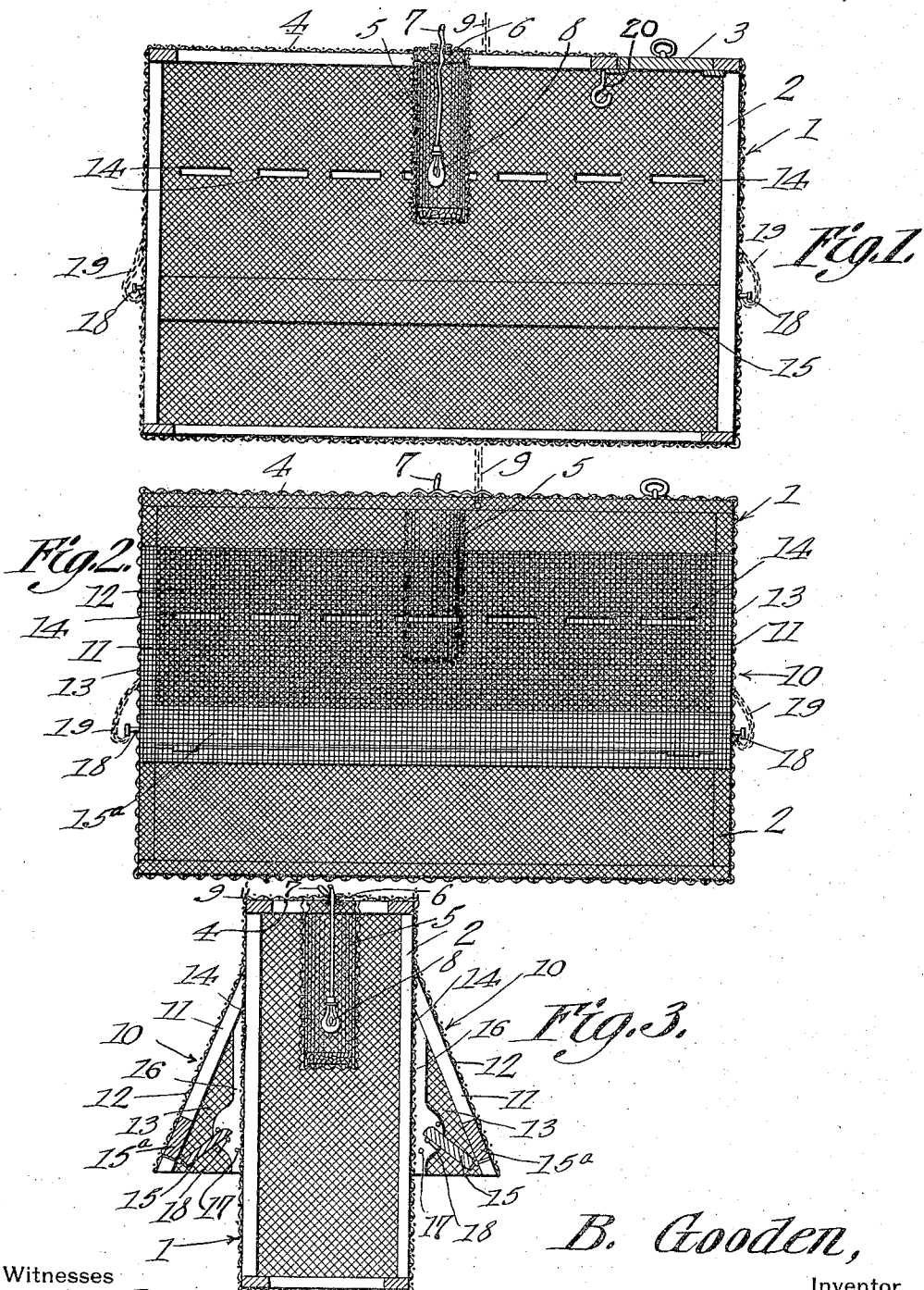

BELMONT GOODEN, OF SAN DIEGO, CALIFORNIA.

INSECT-TRAP.

1,167,897.  Specification of Letters Patent.  Patented Jan. 11, 1916.

Application filed November 2, 1914. Serial No. 869,925.

*To all whom it may concern:*

Be it known that I, BELMONT GOODEN, a citizen of the United States, residing at San Diego, in the county of San Diego and State of California, have invented a new and useful Insect-Trap, of which the following is a specification.

The present invention appertains to insect traps and aims to provide a trap of novel and improved construction adapted for catching flies and other insects.

This invention contemplates the provision of an insect trap provided with unique means for leading the insects into the captivity or confining chamber.

It is also within the scope of the invention, to provide an insect trap which will be comparatively simple and inexpensive in construction, which may be employed for entrapping various species of insects, and which will be convenient, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is a longitudinal vertical section of the trap. Fig. 2 is a side elevation thereof. Fig. 3 is a central cross section of the device.

In carrying out the present invention, there is employed a captivity or confining chamber or compartment 1, which forms the body or casing of the trap, and which comprises the frame 2 having attached thereto, reticulated or meshed wire side, end, bottom and top panels. The said panels are constructed of fine wire mesh, to render them semi-transparent.

The chamber 1 is provided with an upper door 3 adjacent one end thereof to enable access to be had into the interior of the chamber 1, and the top or upper panel 4 of the chamber is provided with a depending reticulated or meshed wire pocket 5 which is normally closed by a cap 6. Electrical conductors 7 are passed through the cap 6 and carry an incandescent lamp 8 which is suspended within the pocket 5 whereby when an electrical current is established through the conductors 7, the lamp 8 will be lighted to illuminate the interior of the trap, when desired. Suitable bait may be disposed within the pocket 5 to serve as a lure for attracting the insects, so that the bait or the light may be employed independently or simultaneously to lure or attract the insects.

If desired, the chamber 1 may be suspended from the ceiling, or other support, by the means of chains or flexible elements 9, although ordinarily, the trap may be set upon the floor, or any other suitable surface.

The opposite sides of the chamber or compartment 1 are provided with inlet leaders 10 into which the insects may enter so as to be led toward the inlets of the chamber 1. Each of the leaders 10 embodies a pair of inclined pieces or members 11 having their upper ends secured to the end members of the frame 2, and a reticulated or meshed wire panel 12 secured upon the pieces or members 11. Reticulated or meshed wire gussets 13 are secured between the end members of the frame 2 and the members 11, to close the ends of the leaders 10, it being noted that the leaders 10 are provided with lower openings through which the insects may pass upwardly into the leaders between the side panels of the chamber 1 and the panels 12. The side panels of the chamber 1 are provided with a series of slots or inlets 14 adjacent, but spaced below, the upper edges of the panels 12 of the leaders.

In order to regulate the sizes of the lower slots or openings of the leaders 10, strips 15 are hinged to longitudinal bars 15ª secured to the lower ends of the pieces or members 11 and are arranged to swing upwardly and downwardly within the lower portions of the leaders 10 to and from the sides of the chamber 1. Thus, a slot is provided between each of the strips 15 and the corresponding side of the chamber 1, and this slot may be made wider or narrower by properly swinging the strip 15. The strips 15 project between the panels 12 and the side panels of the chamber 1, and the slots 14 are located between the strips 15 and the upper edges of the panels 12.

As a means for adjustably supporting the strips 15, cleats 16 are secured to the end members of the frame 2 immediately under the upper ends of the pieces 11 and are provided with a series of apertures 17 adjacent the ends and free edges of the strips 15, pins 18 being insertible through the apertures 17 for supporting the shutter strips 15 at various angles. Thus, by adjusting the pins 18, the shutter strips 15 may be supporter at various angles, according to the width of inlet slots desired. The pins 18 are preferably carried by chains or flexible elements 19 secured or anchored to the end members of the frame 2 in order that the pins will not become displaced or lost accidentally.

In practice, the bait or electric lamp, or both of them may be readily placed with the pocket 5 to attract the insects desired. The insects being lured to the trap will pass upwardly into the leaders 10, it being noted that the shutter strips 15 are inclined inwardly from the lower edges of the panels 12 to assist in leading the insects into the leaders 10. After the insects have entered the leaders 10, the strips 15 will render difficult or impossible, the escape of the insects, and they will finally be attracted to the chamber 1 through the slots or inlets 14 thereof. The insects will then be confined or held captive within the chamber 1 and may be destroyed or exterminated in any manner desired, and discharged by opening the door 3.

By adjusting the pins 18, the slots between the shutter strips 15 and the sides of the chamber 1 may be regulated in width, to adapt the trap for various sizes or species of insects, in order to enable the particular insects to pass freely through the said slots, but to render it difficult or impossible for the insects to escape back through the said slots after once they have entered the leaders 10.

If desired a hook 20 may be secured to the top 4 of the chamber 1 in a depending position adjacent the door 3, for supporting an oil lantern, for use instead of the incandescent lamp.

Having thus described the invention, what is claimed as new is—

An insect trap comprising a confining chamber, an inlet leader therefor embodying an inclined panel attached to one side of said chamber, a strip hinged to the lower edge of said panel and projecting between said panel and side of the chamber, there being a slot between said strip and said side of the chamber, said side of the chamber having openings between said strip and the upper edge of said panel, and means for supporting said strip at various angles.

In testimony that I claim the foregoing as my own, I have hereto affixed my signature in the presence of two witnesses.

BELMONT GOODEN.

Witnesses:
A. N. ANDERSON,
GRACE E. WRIGHT.